United States Patent [19]

Ogura

[11] Patent Number: 4,807,051

[45] Date of Patent: Feb. 21, 1989

[54] IMAGE PICK-UP APPARATUS WITH SOUND RECORDING FUNCTION

[75] Inventor: Tokihiko Ogura, Yokohama, Japan

[73] Assignee: Canon Kabushiki Kaisha, Tokyo, Japan

[21] Appl. No.: 941,199

[22] Filed: Dec. 12, 1986

[30] Foreign Application Priority Data

Dec. 23, 1985 [JP] Japan ............................... 60-291170

[51] Int. Cl.$^4$ .......................... H04N 5/91; H04B 1/20

[52] U.S. Cl. .................................... 358/335; 358/341; 369/2; 381/92; 381/122; 381/124

[58] Field of Search ....................... 358/335, 341, 343; 352/1, 5, 25, 10; 354/75, 76, 467; 369/1, 2, 4; 381/92, 122, 124; 360/19.1

[56] References Cited

U.S. PATENT DOCUMENTS 2,783,677 3/1957 Becker .................................. 352/5
3,837,736 9/1974 Ogiso et al. ........................ 352/1 X
3,958,869 5/1976 Beck .................................. 352/1 X
4,399,327 8/1983 Yamamoto et al. .............. 352/25 X
4,468,710 8/1984 Hashimoto et al. ............ 358/343 X
4,531,161 7/1985 Murakoshi ......................... 360/19.1
4,550,343 10/1985 Nakatani ......................... 381/122 X
4,586,195 4/1986 De George et al. ........... 381/122 X
4,641,937 2/1987 Suzuki ................................ 354/467

FOREIGN PATENT DOCUMENTS 3028375 2/1982 Fed. Rep. of Germany .......... 352/1

*Primary Examiner*—W. B. Perkey
*Attorney, Agent, or Firm*—Robin, Blecker & Daley

[57] ABSTRACT

A sound recordable image pick-up apparatus comprises a microphone for collecting sounds and means for generating information about an object distance. The apparatus is arranged to control the sensitivity of the microphone on the basis of the data generated by the data generating means.

22 Claims, 5 Drawing Sheets

IMAGE PICK-UP APPARATUS WITH SOUND RECORDING FUNCTION

BACKGROUND OF THE INVENTION

1. Field of the Invention

This invention relates to an image pick-up apparatus with a sound recording function and more particularly to an arrangement for switching the sensitivity of the image pick-up apparatus from one sensitivity degree over to another.

2. Description of the Related Art

The camera of the kind arranged to be capable of recording sounds in addition to images, such as an arrangement to record a video signal on a VTR by means of, for example, a TV camera has been known from, for example, Japanese Laid-Open Patent Application No. SHO 55-143896. In the camera of this kind, the directivity of the microphone of the camera is arranged to be variable as follows: Two microphones are directed forward toward the front of the camera with some spacing distance between them on lines extending in parallel to the optical axis of a photo-taking lens. Another microphone is directed backward to pick up sounds also from the rear of the camera. The directivity of the microphone arrangement as a whole is thus arranged to be variable by changing the sensitivity of each of the three microphones according to information on the focal length of the photo-taking lens.

In collecting the sound from an object with the camera of the above-stated kind, however, the sound becomes lower according as a distance between the camera and an object (hereinafter referred to as the object distance) increases. Therefore, the sound from the object has often been vaguely recorded in the event of a long object distance. This has been problem with the conventional camera of the above-stated kind.

SUMMARY OF THE INVENTION

It is a first object of this invention to solve the above-stated problem of the prior art.

It is a second object of this invention to clearly record sounds coming from an object irrespectively of the object distance.

Under this object, a sound recordable image pick-up apparatus which is arranged according to this invention as a preferred embodiment thereof comprises means for generating data corresponding to an object distance and control means for controlling the sensitivity of a microphone on the basis of the data in such a manner that the sensitivity of the microphone is increased in the event of a long distance from the apparatus to an object to be photographed.

It is a third object of this invention to clearly record sounds irrespectively of the object distance by arranging a plurality of microphones and by appropriately using the plurality of microphones according to the object distance.

It is a fourth object of this invention to provide a sound recordable image pick-up apparatus which is capable of adequately displaying a state of recording sounds coming from an object to be photographed.

The above and other objects and features of the invention will become apparent from the following detailed description of embodiments thereof taken in connection with the accompanying drawings.

BRIEF DESCRIPTION OF THE DRAWINGS

FIG. 3(*b*) is a graph showing a relation between the object distance and the output of the comparator 9-1.

FIG. 4(*b*) is a graph showing a relation between the object distance and the gain of an amplifier AMP.

DETAILED DESCRIPTION OF THE PREFERRED EMBODIMENTS

While this invention is applied to a sound recordable electronic still video camera in the preferred embodiments described below, the invention is of course not limited to the camera of that type but is applicable also to a video camera arranged to pick up moving images and a camera of using a silver halide film.

Figure 1:
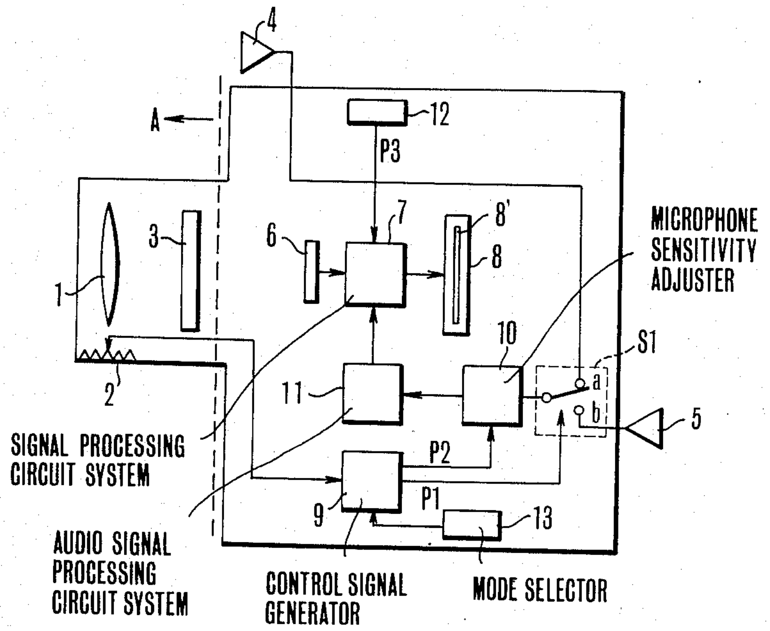
FIG. 1 is a diagram showing in outline the arrangement of an electronic still video camera arranged according to this invention as an embodiment thereof.

FIG. 1 shows in outline the arrangement of an electronic still video camera embodying this invention. The camera is provided with the optical system of a photo-taking lens 1; an object distance detector 2 which is arranged to detect a distance from the camera to an object to be photographed (the object distance) according to the position of a distance ring in response to a phototaking lens driving system; a stop unit 3; a microphone 4 which is directed forward to the front of the camera and is arranged to collect sounds coming from the object; another microphone 5 which is directed backward to the rear of the camera and is arranged to collect sounds produced on the side of the photographer; an image sensor 6 which is arranged to convert an incident light flux coming via the optical system 1 into a video signal; a signal processing circuit system 7 arranged to process the video signal into a signal recordable on a magnetic medium which is not shown; a disc drive system 8 arranged to record the video signal or an audio signal by driving the magnetic medium 8' and a magnetic head; a control signal generator 9 arranged to generate a signal P1 for effecting change-over between the microphones 4 and 5 on the basis of object distance information obtained from the distance detector 2 and to generate a control signal P2 for controlling the sensitivity of the microphones 4 and 5; a microphone sensitivity adjuster 10; an audio signal processing circuit system 11 arranged to store an audio signal at a memory by time base compressing the audio signal and to convert the audio signal into a signal form recordable on the magnetic medium; a control circuit system 12 arranged to generate a control signal P3 for controlling either video recording or audio recording; and a mode selector 13 arranged to select between an automatic operation or a manual operation for the change-over between the microphone and the adjustment of the sensitivity of the microphones. In FIG. 1, a part A represents a lens part which is arranged to be interchangeable with another lens part.

The embodiment which is arranged as shown in FIG. 1 operates in the following manner: Let us first assume that the automatic microphone change-over and sensitivity adjustment operation is selected by the mode selector 13. In cases where the position of the distance ring of the lens A is set for a long distance, it is often impossible to collect sounds. In such a case, it is often preferable to record some vocal description of the photographing object rather than the sound of the object. In this specific embodiment, the switch S1 is arranged to permit automatic change-over selection between the use of the microphone 4 and that of the other microphone 5 on the basis of the signal P1 from the control signal generator 9. The position of the switch S1 shifts to a position "b" if the object is located far away and to another position "a" in the event of a nearby object. Therefore, sound recording can be accomplished in the optimum manner according to the distance condition of the object. Further, the control signal P2 which is produced from the control signal generator 9 for controlling the sensitivity of the microphones 4 and 5 can be adjusted by the control circuit system 12 in such a manner as to increase the sensitivity of the microphone 4 for a distant object to decrease it for a nearby object. Therefore, the sound recording sensitivity can be always set at the optimum degree according to the distance signal produced from the distance detector 12 with the switch S1 left in its position "a" to permit the use of the microphone 4 which is disposed on the side of the object. Meanwhile, when a shutter button which is not shown is pushed, an optical image incident on the image sensor 6 is, for example, frequency modulated by the signal processing system 7 in response to the control signal P3 generated by the control circuit 12. The video signal which is thus obtained is recorded on the magnetic medium 8' by means of a magnetic head which is not shown but is included in the disc drive system 8. In case that a manual operation is selected by the mode selector 13 for the microphone change-over and the sensitivity adjustment, the position of the switch S1 is changed from one position over to the other according to a signal generated by a manual operation on the mode selector 13, so that one of the microphones 4 and 5 can be selectively used by the manual selection.

Figure 2:
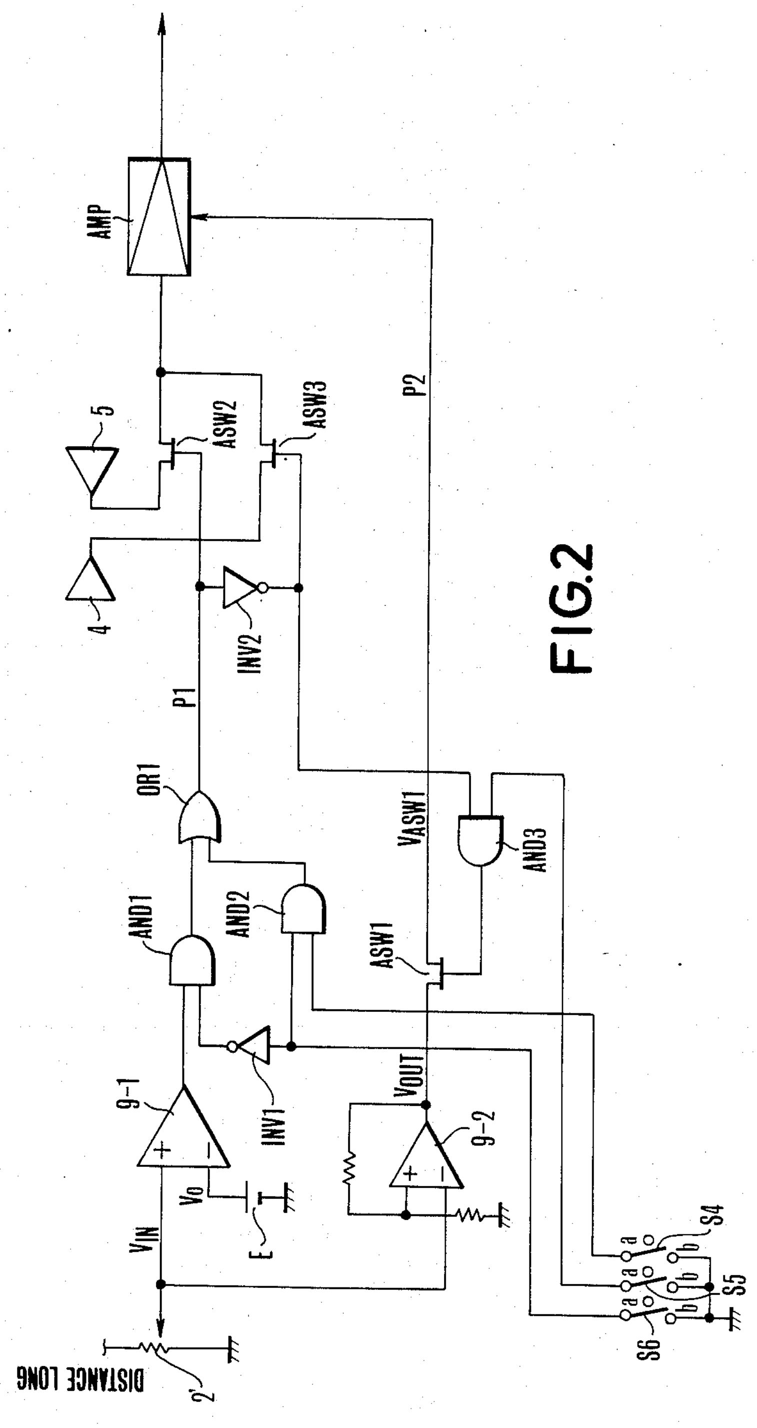
FIG. 2 is a circuit diagram showing the arrangement of a distance detector 2, a control signal generator 9, a mode selector 13 and a switch S1 of FIG. 1. together with related peripheral parts.

FIG. 2 shows the more specific arrangement of the embodiment shown in FIG. 1. The illustration includes the distance detector 2, the control signal generator 9, the mode selector 13, the switch S1 and associated parts. The mode selector 13 includes mode-change-over switches S4, S5 and S6, which are arranged to be manually operated. The switch S4 permits manual selection of one of the microphones 4 and 5. The microphone 4 is selected when the switch S4 is in its position "a". The microphone 5 is selected when the switch S4 is in another position "b". The switch S5 is provided for selection as to whether the sensitivity of the microphones 4 and 5 is to be adjusted according to the distance information produced from the distance detector 2 or not. The sensitivity is adjusted according to the distance information with the switch S5 shifted to its position "a" and is not adjusted according to the information with the switch S5 shifted to another position "b" thereof. The switch S6 is provided for selection between automatic change-over and manual change-over of the microphones 4 and 5. The switch S6 is shifted to the position "a" thereof to permit manual selection of the microphone 4 or 5 by means of the switch S1 and shifted to another position "b" thereof to have the change-over made between the microphones 4 and 5 according to the distance information produced from the distance detector 2.

The distance detector 2 is composed of a variable resistor which is arranged to vary its resistance value in such a way as to change a voltage VIN according to the position of the distance ring and a voltage source. A comparator 9-1 is arranged to compare the voltage VIN with a voltage VO which is set at a reference voltage source E and to produce the above-stated signal P1 indicating whether the switch S1 is to be shifted to the position "a" or to the other position "b" according to the result of the comparison. Further, the switch S1 of FIG. 1 is indicated in the form of analog switches ASW1 and ASW2 and an inverter INV2 in FIG. 2. An operational amplifier 9-2 is arranged to control the gain of a sensitivity adjuster 10 according to the voltage VIN. The illustration of FIG. 2 further includes AND gates AND1, AND2 and AND3; an OR gate OR1; inverters INV1 and INV2; analog switches ASW1, ASW2 and ASW3; and an amplifier AMP which is arranged to have the gain thereof vary with the output of the switch ASW1. With the embodiment arranged as shown in FIG. 2, it operates as described below:

To select automatic change-over between the microphones 4 and 5, the switch S6 is shifted to its position "b" after the switch S5 is shifted to its position "a" to have the sensitivity adjustment performed in accordance with the object distance. In this instance, a high level signal is supplied to one of input terminals of the AND gate AND3 as the switch S5 is in the position "a". A high level signal is supplied via the inverter INV1 to one of input terminals of the AND gate AND1. A low level signal is supplied to one of input terminals of the AND gate AND2. Therefore, the circuit operation is performed irrespective of the operation of the switch S4. In the event of a long object distance, the resistance value of the variable resistor 2' increases according to the position of the distance ring of the photo-taking lens and thus exceeds a threshold value set by the reference voltage source E. The output of the comparator 9-1 is at a high level. With a high level signal coming via the AND gate AND1 and the OR gate OR1 to the inverter INV2, the switch ASW2 alone becomes conductive while the switch ASW3 remains nonconductive. As a result, the output of the microphone 5 which is directed to the rear of the camera is supplied to the amplifier AMP disposed in the downstream part of the circuit arrangement.

In case that the object distance is short and the resistance value of the variable resistor 2' is lower than the threshold value set by the reference voltage source E, the output of the comparator 9-1 is at a low level. The low level output or signal is supplied via the AND gate AND1 and the OR gate OR1 to the inverter INV2. As a result, the switch ASW3 alone becomes conductive while the switch ASW2 is non-conductive.

Figure 3A:
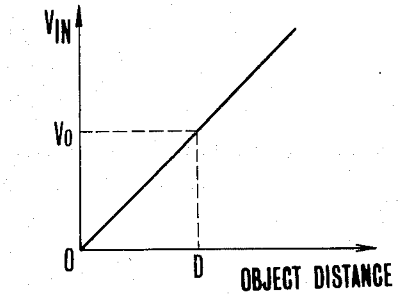
FIG. 3(*a*) is a graph showing a relation between the object distance and the input voltage V1 of a comparator 9-1.
Figure 3B:
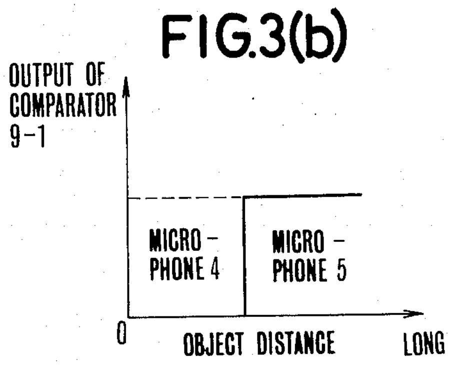

FIGS. 3(*a*) and 3(*b*) show the above-stated selection between the microphones 4 and 5 in relation to the object distance. As shown in FIG. 3(*a*), the input voltage VIN of the comparator 9-1 increases and exceeds a reference voltage VO when the object distance is long. Then, as shown in FIG. 3(*b*), the output level of the comparator 9-1 rises from a low level to a high level and the use of the microphone 4 is changed over to the use of the other microphone 5.

Figure 4A:
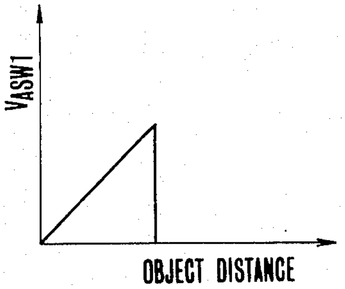
FIG. 4(*a*) is a graph showing a relation between the object distance and the output voltage VASW1 of an analog switch ASW1.
Figure 4B:
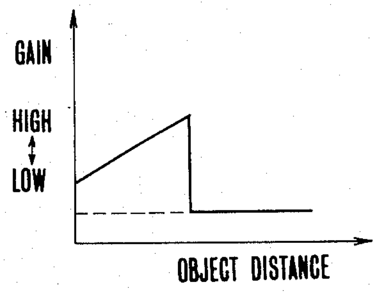

The relation of the object distance to the gain of the amplifier AMP is as follows: When the microphone 4 which is directed to the front of the camera is selected for an object located at a short distance, the output of the comparator 9-1 is at low level. Then, a high level signal is supplied via the inverter INV2 to one of the input terminals of the AND gate AND3. Meanwhile, the switch S5 has been shifted to its position "a" as mentioned in the foregoing and a high level signal is received at the other input terminal of the AND gate AND3. Accordingly, the output level of the AND gate AND3 becomes high to render the switch ASW1 conductive. Therefore, while the switch ASW1 is conductive, that is, as long as the microphone 4 is selected, the gain of the amplifier AMP changes according to the output of the operational amplifier 9-2. The gain of the amplifier AMP remains unvarying while the switch ASW1 is in a nonconductive state. FIGS. 4(*a*) and 4(*b*) show this. FIG. 4(*a*) shows the output voltage VASW1 of the switch ASW1 in relation to the object distance. FIG. 4(*b*) shows the gain of the amplifier AMP in relation to the object distance. As shown in FIG. 4(*a*), the output voltage VASW1 increases according as the object distance increases. Then, as shown in FIG. 4(*b*), the gain of the amplifier AMP also gradually increases according as the object distance increases. When the use of the microphone 4 is changed over to the microphone 5 with the object distance coming to exceed a given value, the output level of the AND gate AND3 changes from a high level to a low level. The switch ASW1 becomes nonconductive. The gain of the amplifier AMP then decreases as shown in FIG. 4(*b*). In case that the microphone 5 which is directed to the rear of the camera is selected instead of the microphone 4, the voice of the photographer can be recorded to the same effect as recording with a nearby microphone. Therefore, in that event, the sound pressure level tends to become high to make the output of the amplifier AMP saturated. In the event of selection of the microphone 5 in place of the microphone 4, therefore, the output of the amplifier AMP is prevented from becoming saturated by decreasing the gain of the amplifier AMP and by lowering the sensitivity of the microphone accordingly.

Figure 5A:
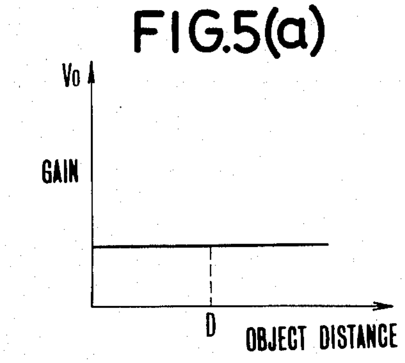
FIGS. 5(*a*) and 5(*b*) are graphs showing the object distance in relation to the gain of the amplifier AMP and in relation to the output of the comparator 9-1 when the positions of switches S5 and S6 are shifted to their positions "b" respectively.
Figure 5B:
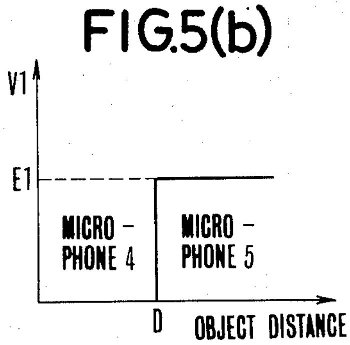

In case that the switch S5 is shifted to its position "b" to have the sensitivity adjustment not performed according to the object distance and that the switch S6 is shifted to its position "b" for automatic change-over between the microphones 4 and 5, the embodiment operates as follows: Since the switch S5 is in its position "b" in this case, a low level signal comes to one of the input terminals of the AND gate AND3. The output level of the AND gate AND3 becomes low to render the switch ASW1 non-conductive. Accordingly, the amplification degree of the amplifier AMP becomes unvarying. Then, as shown in FIGS. 5(*a*) and 5(*b*), change-over between the microphones 4 and 5 comes to be performed solely in an automatic manner.

Next, when the switch S5 is shifted to its position "a" and the switch S6 is also shifted to its position "a" to have the change-over between the microphones 4 and 5 not automatically performed and to have only the sensitivity adjustment performed according to the object distance, the embodiment operates as follows: In that instance, a high level signal comes to the inverter INV1. Therefore, a low level signal comes to one of the input terminals of the AND gate AND1. Accordingly, the use of the microphones 4 and 5 is not automatically changed from one over to the other according to the position of the distance ring. Then, the output of the microphone 4 or 5 selected by the switch S4 is amplified by the amplifier AMP which is disposed in the rear part.

Figure 6A:
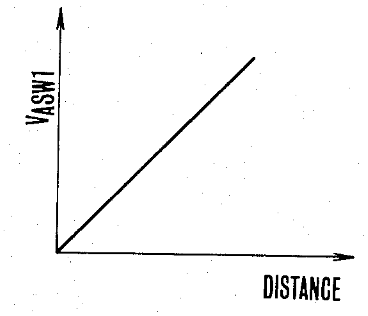
FIGS. 6(*a*) and 6(*b*) are graphs showing respecitvely a relation between the object distance and the output voltage VASW1 of the analog switch ASW1 and a relation between the object distance and the sensitivity of microphones obtained with the switches S5 and S6 shifted to their positions "a" respectively.
Figure 6B:
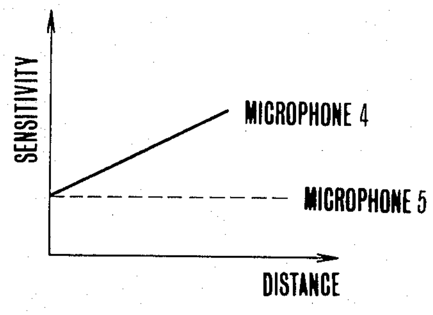

In that instance, when the microphone 4 which is directed forward to the front of the camera is selected, the gain of the amplifier AMP changes according to the object distance as shown in FIGS. 6(*a*) and 6(*b*) in the same manner as described in the foregoing. If the microphone 5 which is directed backward to the rear of the camera, the switch ASW1 becomes non-conductive to make the gain of the amplifier AMP unvarying.

Further, in case that the switch SW5 is shifted to its position "b" while the switch S6 is shifted to its position "a", that is, when change-over between the microphones 4 and 5 is not to be automatically performed and the sensitivity adjustment is not to be performed according to the object distance, the selection between the microphones 4 and 5 is made simply by means of the switch S4.

Figure 7:
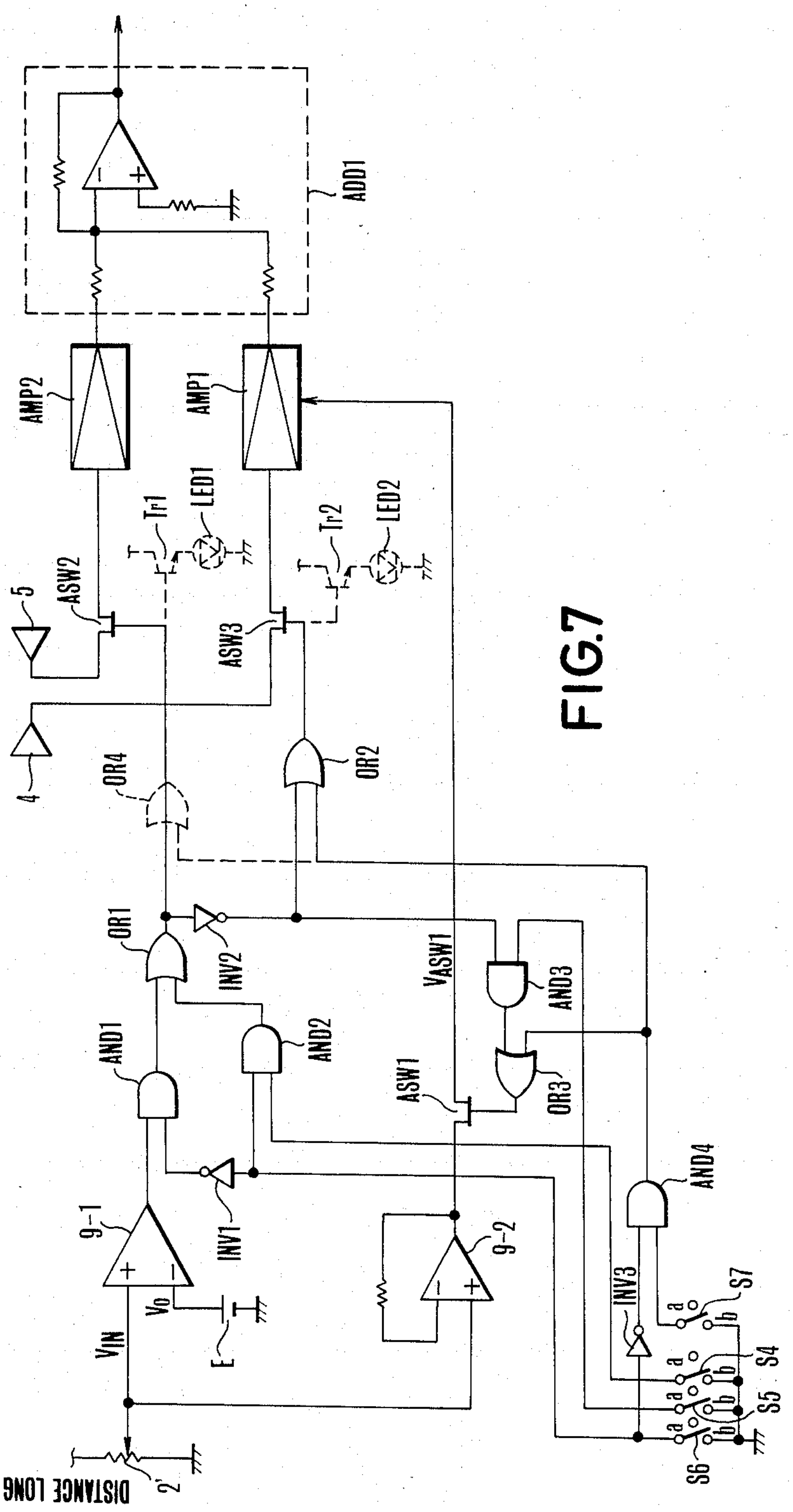
FIG. 7 is a circuit diagram showing another embodiment of this invention in which the embodiment shown in FIG. 2 is modified.

Referring to FIG. 7, another embodiment of this invention is arranged to mix the output of a microphone 4 which is directed forward to the front of the camera and that of a microphone 5 which is directed backward to the rear of the camera. In FIG. 7, the elements performing the same functions as those of corresponding elements of FIG. 2 are indicated by the same reference numerals and symbols as those of FIG. 2 and the details of them are omitted from the following description: A switch S7 is provided for selection between having the outputs of the microphones 4 and 5 mixed together and having these outputs not mixed. The outputs of these microphones 4 and 5 are mixed when the position of this switch S7 is shifted to its position "a" and are not mixed when the switch S7 is shifted to the other position "b". In the latter case, the operation is performed in exactly the same manner as in the case of the preceding embodiment shown in FIG. 2. The embodiment includes an AND gate AND4; an inverter INV3; an amplifier AMP2 which is arranged to amplify the output of the microphone 5 received via the switch ASW2 and has an unvarying amplification degree; and an adder ADD1 which is arranged to mix the outputs of the amplifiers AMP1 and AMP2.

Figure 8A:
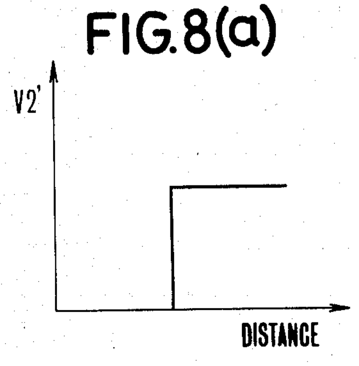
FIGS. 8(*a*) and 8(*b*) are graphs showing a relation between the object distance and the output of the comparator 9-1 and a relation between the object distance and the sensitivity of the microphones 4 and 5 obtained with a switch S7 shifted to its position 'a' and the switch S6 to its position "b".
Figure 8B:
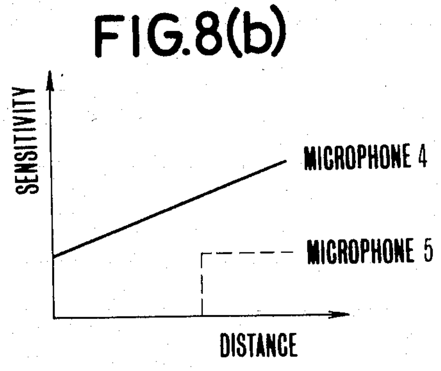

The embodiment which is arranged as described above operates in the following manner: In case that the switch S7 is shifted to the position "b" thereof, the adder ADD1 produces the same output as in the case of the preceding embodiment shown in FIG. 2. Therefore, the operation under this condition is omitted. Meanwhile, when the switch S6 is shifted to its position "b" to automatically select the microphone 4 or 5 according to the distance information coming from the distance detector 2 and the switch S7 is shifted to its position "a", the output level of the AND gate AND4 becomes high to render the switches ASW1 and ASW3 conductive via OR gates OR2 and OR3. In this case, therefore, the output of the microphone 4 is amplified by the amplifier AMP1 according to the object distance. Under this condition, when the output level of the comparator 9-1 becomes high because of a long object distance, if the switch ASW2 has been rendered conductive via the AND gate AND1, the output of the other microphone 5 is also amplified by the amplifier AMP2. The output of the amplifier AMP2 is then added by the adder ADD1 to the output of the microphone 4 amplified by the amplifier AMP1 as shown in FIGS. 8(*a*) and 8(*b*). The adder ADD1 thus produces the amplified outputs of the two microphones 4 and 5 in a mixed state.

When the output level of the comparator 9-1 becomes low because of a short object distance, the output level of the AND gate AND1 becomes low to render the switch ASW2 non-conductive. Therefore, in that instance, the output of the microphone 5 is not added to that of the microphone 4. The output of the microphone 4 is along amplified by the amplifier AMP1 to a degree of gain corresponding to the object distance.

In other words, the output of the microphone 4 which is directed forward to the front of the camera is produced from the adder ADD1 when the object distance is short. Whereas, in the event of a long object distance, the output of the microphone 5 which is directed backward to the rear of the camera is added to the output of the microphone 4 which is amplified to a degree of gain according to the object distance and the adder ADD1 produces the result of addition. Therefore, while the microphone 4 which is directed to the front of the camera is used for an object located at a short distance, the output of the microphone which is directed to the rear of the camera can be mixed with the output of the microphone 4 before sound recording for an object located at a long distance. Again referring to FIG. 7, an OR gate OR4 which is indicated with a broken line may be included in the embodiment. In that case, the output of the microphone 4 which is amplified to a degree of gain corresponding to the object distance can be recorded always with the output of the microphone 5 irrespectively of the object distance.

Figure 9A:
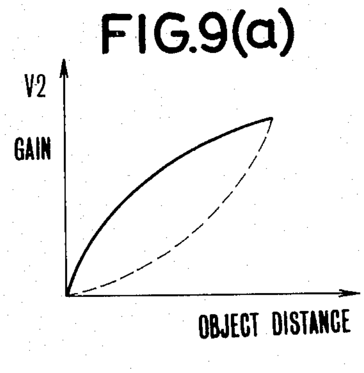
FIGS. 9(*a*) and 9(*b*) are graphs respectively showing other examples of relation between the object distance and the gain of the amplifier AMP.
Figure 9B:
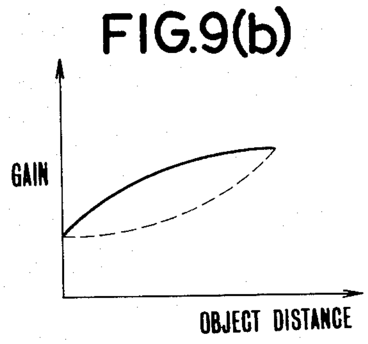

Further, in the case of this embodiment, the gain of the amplifier AMP is in a linear relation to the object distance as shown in FIG. 6(*b*) (as the microphone 4). However, this relation may be changed into non-linear relations as shown in FIGS. 9(*a*) and 9(*b*).

Further, transistors Tr1 and Tr2 and light emitting diodes LED1 and LED2 which are indicated by broken lines in FIG. 7 may be arranged in some suitable positions on the rear side of the camera to enable the photographer to see which of the microphones 4 and 5 is in use.

As described in the foregoing, the embodiment is arranged to have the use of the microphone disposed in front of the camera and another microphone disposed in the rear of the camera automatically changed from one over to the other according to the object distance. In the case of a long object distance, therefore, the signal coming throught the microphone directed to the rear of the camera can be preferably recorded.

In the embodiment give, the detector 2 which detects the object distance through the position of the distance ring of the photo-taking lens system is employed as means for generating information or data representing the object distance. However, this detector 2 of course may be replaced with some other distance detector. For example, a distance detector which is provided for automatic focusing purpose may be arranged to perform the same function as the detector 2.

In accordance with this invention, the sensitivity of the microphone is adjusted according to the object distance, so that the sounds of an object to be photographed can be clearly recorded even in the event of a long object distance.

What is claimed is:

1. An apparatus for recording a sound from an object, comprising:
   (a) means for generating information on a distance from said object to said apparatus;
   (b) first converting means for converting said sound into an electrical signal;
   (c) second converting means for converting said sound into an electrical signal, the characteristic of said second converting means being different from that of said first converting means; and
   (d) means for selecting said first converting means or said second converting means according to said information generated by said generating means.

2. The apparatus of claim 1, wherein said control means is arranged to change the combination of said first and second converting means.

3. The apparatus of claim 1, wherein each of said first and second converting means includes a microphone; and the characteristics of said first and second converting means are differentiated from each other by differentiating their directivities.

4. The apparatus of claim 3, wherein the microphone of said first converting means is directed forward and that of said second converting means is directed backward.

5. The apparatus of claim 4, wherein said control means is arranged to select said second converting means when said information indicates that said distance is longer than a predetermined value.

6. The apparatus of claim 4, wherein said control means is arranged to have the sensitivity of said first converting means increased according as said distance increases.

7. The apparatus of claim 1, further comprising:
   (e) recording means for recording on a recording medium said electrical signal obtained from said first or second converting means.

8. The apparatus of claim 1, further comprising:
   (d) means for converting an image of said object into an electrical signal.

9. The apparatus of claim 8, further comprising:
   (e) means for recording said electrical signal converted from said sound and said image of said object.

10. The apparatus of claim 1, further comprising:
   (d) optical means for imaging said object, said generating means being arranged to generate said information according to the state of said optical means.

11. The apparatus of claim 10, wherein said optical means is a photo-taking lens arranged to pick up an image of said object; and said generating means is arranged to generate said information by detecting the position of a distance ring provided on said photo-taking 12. An apparatus for recording a sound coming from an object, comprising:

(a) first means for converting said sound into an electrical signal;

(b) second means for converting said sound into an electrical signal;

(c) means for generating information on a distance between said object and the apparatus;

(d) control means arranged to selectively operate said first converting means or said second converting means according to said information generated by said generating means; and (e) display means for making a display indicating which of said first and second converting means is being operated.

13. The apparatus of claim 12, further comprising:

(f) recording means for recording on a recording medium said electrical signal obtained from said converting means.

14. The apparatus of claim 12, further comprising:

(f) means for converting an image of said object into an electrical signal.

15. The apparatus of claim 14, further comprising:

(g) means for recording said electrical signal obtained by conversion from said sound and said image of said object.

16. An apparatus for recording a sound coming from an object, comprising:

(a) first means for converting said sound into an electrical signal, said means being directed forward of said apparatus;

(b) second means for converting said sound into an electrical signal, the characteristics of said second means being different from that of said first means;

(c) control means for selectively operating said first converting means or said second converting means; and (d) display means for making a display indicating an operating state of said first and second converting means, so that it can be observed from backward of said apparatus.

17. The apparatus of claim 16, further comprising:

(e) means for generating information on a distance between said object and the apparatus.

18. The apparatus of claim 17, wherein said control means is arranged to selectively operate said first converting means or said second converting means according to said information generated by said generating means.

19. The apparatus of claim 16, further comprising:

(e) recording means for recording on a recording medium said electrical signal obtained from said converting means.

20. The apparatus of claim 16 further comprising:

(e) means for converting an image of said object into an electrical signal.

21. The apparatus of claim 20 further comprising:

(f) means for recording said electrical signal obtained by conversion from said sound and said image of said object.

22. Apparatus of claim 16, wherein said second means is directed backward of said apparatus.

* * * * *